No. 713,034. Patented Nov. 4, 1902.
C. A. WHITE.
LEMON SQUEEZER.
(Application filed Sept. 28, 1901.)
(No Model.)

WITNESSES:
Charles Hanimann
O. H. Tangeman.

INVENTOR
Clarence Augustus White,
BY
Geo. C. Graham
ATTORNEY

THE NORRIS PETERS CO., PHOTO-LITHO., WASHINGTON, D. C.

UNITED STATES PATENT OFFICE.

CLARENCE AUGUSTUS WHITE, OF GOSHEN, NEW YORK.

LEMON-SQUEEZER.

SPECIFICATION forming part of Letters Patent No. 713,034, dated November 4, 1902.

Application filed September 28, 1901. Serial No. 76,979. (No model.)

*To all whom it may concern:*

Be it known that I, CLARENCE AUGUSTUS WHITE, a citizen of the United States, residing at Goshen, Orange county, and State of New York, have invented a new and useful Improvement in Lemon-Squeezers, of which the following is a specification.

The present invention relates generally to a combination implement or tool involving in the main a lemon or other squeezer and in addition thereto a nut-cracker and a cork-compressor.

The improvement embraces, among other things, a base supporting a lemon or other support or cone and preferably providing a receptacle for the reception of the juice and an oscillatory and compressing member coacting with said support or cone. In addition the base and coacting member each is provided with a jaw acting as a nut-cracker and also each with a jaw acting as a cork-compressor, the whole providing a hand implement adapted for use for the purposes specified.

The accompanying drawings, forming a part hereof, illustrate a practical embodiment of the invention, in which—

Figure 1:
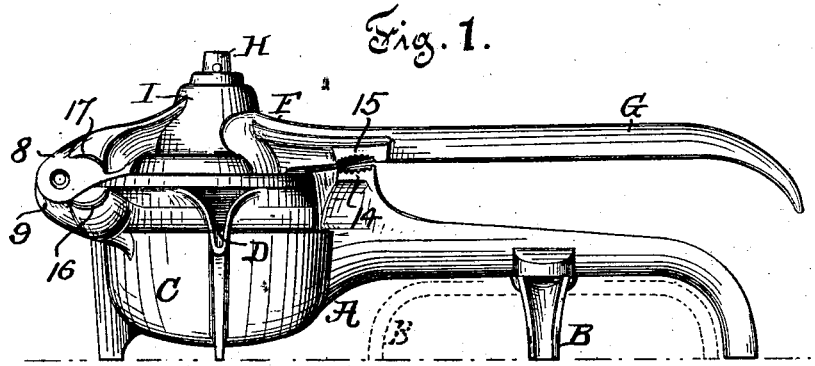
Figure 2:
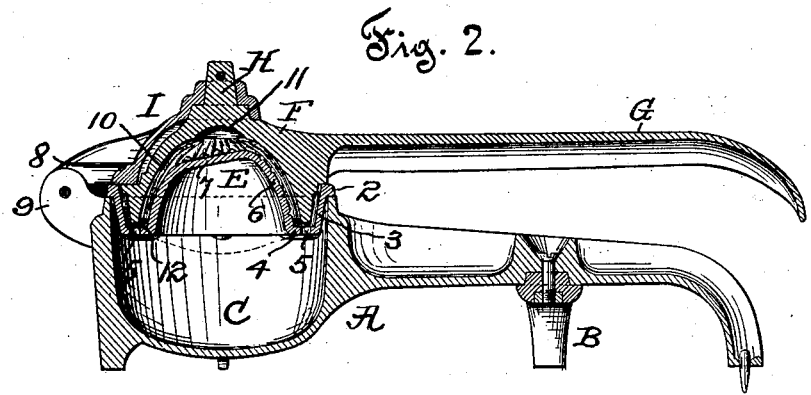
Figure 3:
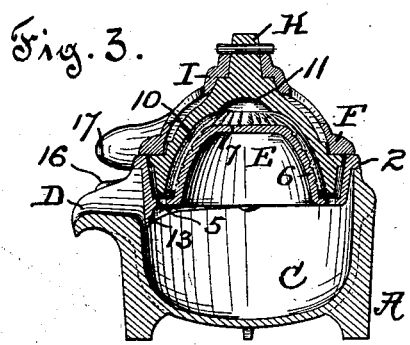
Figure 4:
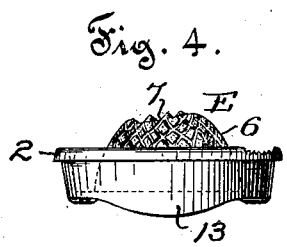

Figure 1 is a side elevation; Fig. 2, a longitudinal vertical section; Fig. 3, a cross-section. Fig. 4 is an elevation of the support or cone.

Referring to said drawings, the improved implement or tool consists of a suitable base A, providing suitable rests, legs, or the like by which the whole may be properly supported on a table, shelf, or counter for use, and one of the supports may be a pair of transverse legs B, pivotally connected to the base, capable of being swung into alinement with the base, as shown by dotted lines, when not in use. The base also provides a juice receptacle or reservoir C, having a pouring-spout D for delivering the collected juices when the implement is tilted for that purpose or which may flow when full into another vessel when quantity is desired. The base, furthermore, immediately over the juice-receptacle forms a seat for a lemon or other fruit support or cone E, which is provided with a circular flange 2 for resting on the base on the edge of the juice-receptacle, a portion 3, depending into the receptacle, a short horizontal portion 4, having openings 5 for the passage of the juice from the support to the receptacle, and an uprising cone 6 for the lemon or other fruit, preferably of irregular truncated form and corrugated or roughened on its surface for more efficient use. The irregular truncated form of the conical support, as in Fig. 2, preferably is formed at its apex with a slight incline for balancing the fruit in proper position and with a depressed top 7, having a barbed rim providing a space in which the core of the fruit being squeezed may lodge while under compression, and thus allow the entire juice-containing portions of the fruit up to the rind to be brought into close contact with the abrading-surface of the cone. With this supporting-cone there coacts an oscillatory member F, having a handle or lever G for manipulation and a central pivot H. The pivot is mounted in bearings in a holder I, partially overlying the oscillatory member and hinged through suitable ears 8 to corresponding ears 9 on the base, so that the oscillatory member, with its holder, may be swung upward away from the conical support to position the fruit to be squeezed, remove the remnant, and be swung downward to compress the fruit and squeeze the juice therefrom. The oscillatory member F has a conical recess 10, adapted to the conical support or cone E, having preferably a further recess 11 at its apex for the reception of the knob of the apex of the fruit. The wall of the conical recess 10 may be corrugated, as shown. Said oscillatory member is extended downwardly and outwardly to provide downward and exterior ribs 12, fitting the exterior wall of the cone and its horizontal portion, so that the juice-producing matter that escapes from the fruit is effectually ground and the openings 5 cleared of pulp as the member is oscillated for the free passage of the juices to the receptacle.

The conical support E is made removable from its support on the base, and immediately adjacent the pouring-spout the support is provided with a depending lip 13, curved and guarding the exit of the spout to strain the extracted juice.

The base A is provided with one jaw 16 of the nut-cracker, and the holder I is also formed with a coacting member 17, so that when the nut is inserted between the two members a down pressure on the lever G of the oscillatory member will crack the nut. The base also supports or is provided with a preferably concaved and corrugated seat 15 and the oscillatory member with a similar seat 16, between which seats a cork may be placed, and by the rocking action and downward compression of the oscillatory member the cork may be more or less compressed.

What is claimed is—

1. A lemon-squeezer consisting of the cupped base having supporting and fastening means, the cone arranged in the cup and having a flange supporting the cone and an annular channel provided with outlets, a compressing member having a handle and a conical stud on its upper side, a hinge connected to the base and having an opening to receive the stud on the compressing member.

2. A lemon-squeezer consisting of a cupped base having supporting-legs and an integral handle having supporting means, a cone arranged in the cup having a juice-channel provided with outlets and a supporting-flange, a compressing member having a handle and provided with a stud on its upper face, a hinge connected to the base and having an opening to receive said stud, to permit said compressing member to have a reciprocating and an oscillating movement with reference to the cone.

In testimony whereof I have signed my name to this specification, in the presence of two subscribing witnesses, this 25th day of May, 1901.

CLARENCE AUGUSTUS WHITE.

Witnesses:
H. V. D. HOYT,
S. P. DUSENBERY.